United States Patent
Chou et al.

(10) Patent No.: US 12,010,187 B2
(45) Date of Patent: Jun. 11, 2024

(54) BUSINESS DATA EXCHANGE SYSTEM AND BUSINESS DATA EXCHANGE METHOD

(71) Applicants: Digiwin Software Co., Ltd, Shanghai (CN); DATA SYSTEMS CONSULTING CO., LTD., New Taipei (TW)

(72) Inventors: Hung-Ta Chou, Shanghai (CN); Guoxin Sun, Shanghai (CN)

(73) Assignees: Digiwin Software Co., Ltd, Shanghai (CN); DATA SYSTEMS CONSULTING CO., LTD., New Taipei (TW)

( * ) Notice: Subject to any disclaimer, the term of this patent is extended or adjusted under 35 U.S.C. 154(b) by 0 days.

(21) Appl. No.: 17/882,614

(22) Filed: Aug. 8, 2022

(65) Prior Publication Data
US 2023/0308517 A1    Sep. 28, 2023

(30) Foreign Application Priority Data

Mar. 23, 2022    (CN) .......................... 202210286490.0

(51) Int. Cl.
G06F 15/16    (2006.01)
G06F 9/54     (2006.01)
H04L 67/51    (2022.01)

(52) U.S. Cl.
CPC .............. H04L 67/51 (2022.05); G06F 9/547 (2013.01)

(58) Field of Classification Search
CPC ......... H04L 67/51; G06F 9/5077; G06F 9/547
See application file for complete search history.

(56) References Cited

U.S. PATENT DOCUMENTS

2022/0382729 A1* 12/2022 Wu .................... G06F 16/2264
2023/0010219 A1*  1/2023 Howley ............. H04L 41/0806

* cited by examiner

*Primary Examiner* — Padma Mundur
(74) *Attorney, Agent, or Firm* — JCIPRNET (57) ABSTRACT

A business data exchange system and a business data exchange method are provided. The business data exchange system includes a software as a service processor and a tenant processor. The software as a service processor is coupled to a software as a service application program. The tenant processor is coupled to the software as a service processor and an application system. When the software as a service application program calls an application program of the application system, the software as a service processor transmits call information to the tenant processor. The tenant processor receives the call information and parses the call information to call the application system and transmit the call information to the application system. The application system parses the call information and performs logical processing to generate business data, and the application system returns the business data to the software as a service application program.

9 Claims, 6 Drawing Sheets

BUSINESS DATA EXCHANGE SYSTEM AND BUSINESS DATA EXCHANGE METHOD

CROSS-REFERENCE TO RELATED APPLICATION

This application claims the priority benefit of China application serial no. 202210286490.0, filed on Mar. 23, 2022. The entirety of the above-mentioned patent application is hereby incorporated by reference herein and made a part of this specification.

BACKGROUND

Technical Field

The disclosure relates to a data processing technology, in particular to a business data exchange system and a business data exchange method.

Description of Related Art

With the application of software as a service (SaaS) becoming more and more popular, many enterprises begin to use relevant software as a service application programs to implement relevant business operations or business behaviors. In this regard, if the enterprise itself has an internal business system, how to efficiently and reliably exchange data between the software as a service application programs and the internal business system of the enterprise has always been an important topic in the art. However, the conventional common practice can be implemented by, for example, means of manual input or system polling, which has the issues of labor-intensive, non-instant data synchronization, and error-prone.

SUMMARY

The disclosure provides a business data exchange system and a business data exchange method, which can enable a software as a service application program to perform efficient and reliable data exchange with an internal business system of an enterprise.

According to an embodiment of the disclosure, the business data exchange system of the disclosure includes a software as a service processor and a tenant processor. The software as a service processor is coupled to a software as a service application program. The tenant processor is coupled to the software as a service processor and an application system. When the software as a service application program calls an application program of the application system, the software as a service processor transmits call information to the tenant processor. The tenant processor receives the call information and parses the call information to call the application system and transmit the call information to the application system. The application system parses the call information and performs logical processing to generate business data. The application system returns the business data to the software as a service application program.

According to an embodiment of the disclosure, the business data exchange method of the disclosure includes the following steps. When a software as a service application program calls an application program of an application system, call information is transmitted to a tenant processor through a software as a service processor. The call information is received through the tenant processor, and the call information is parsed to call the application system and transmit the call information to the application system. The call information is parsed through the application system, and logical processing is performed to generate business data. The business data is returned to software as a service application program through the application system.

Based on the above, the business data exchange system and the business data exchange method of the disclosure can implement the connection between the software as a service application program and the business system through the software as a service processor and the tenant processor, and perform an efficient and reliable data exchange function accordingly.

In order for the features and advantages of the disclosure to be more comprehensible, the following specific embodiments are described in detail in conjunction with the drawings.

DETAILED DESCRIPTION OF DISCLOSED EMBODIMENTS

Reference will now be made in detail to the exemplary embodiments of the disclosure, examples of which are illustrated in the drawings. Wherever possible, the same reference numerals are used in the drawings and description to refer to the same or similar parts.

Figure 1:
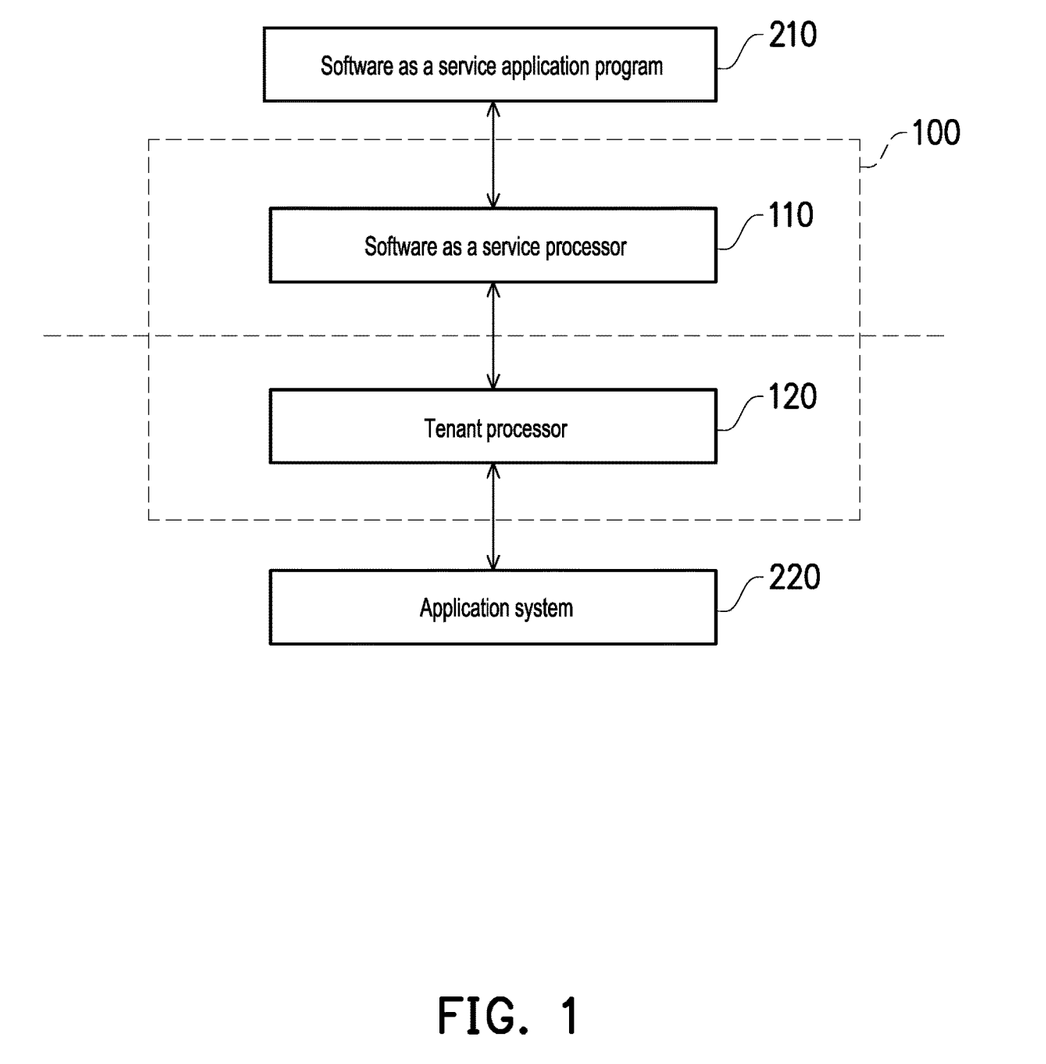
FIG. 1 is a schematic diagram of a business data exchange system according to an embodiment of the disclosure.

FIG. 1 is a schematic diagram of a business data exchange system according to an embodiment of the disclosure. Referring to FIG. 1, a business data exchange system 100 includes a software as a service (SaaS) processor 110 and a tenant processor 120. The software as a service processor 110 is coupled to a software as a service application program 210 and the tenant processor 120. The tenant processor 120 is also coupled to an application system 220. In the embodiment, the software as a service processor 110 and the software as a service application program 210 may be, for example, set in the cloud, such as a cloud server, and the tenant processor 120 and the application system 220 may be set at a ground end, such as a tenant server. The software as a service processor 110 and the tenant processor 120 may be connected through wired and/or wireless communication or the Internet.

In the embodiment, the cloud server and the tenant server may individually include a processing unit and a storage unit. The processing unit may include, for example, a central processing unit (CPU), other programmable general-purpose or special-purpose microprocessors, digital signal processors (DSPs), application-specific integrated circuits (ASICs), programmable logic devices (PLDs), other similar processing circuits, or a combination of the devices. The storage unit may include a memory and/or a database, wherein the memory may be, for example, a non-volatile memory (NVM). The storage unit may store relevant programs, modules, processors, systems, or algorithms for implementing the embodiments of the disclosure, so that the processing unit can access and execute the relevant functions and operations described in the embodiments of the disclosure.

In the embodiment, when a user operates the software as a service application program 210 set in the cloud and intends to call the application system 220 of the tenant server at the ground end, the software as a service processor 110 of the business data exchange system 100 may connect to the tenant processor 120 through a pre-established transmission channel, so that the tenant processor 120 may instantly call a specific application (a specific service function) in the application system 220, and return a call result (for example, specific business data) to the software as a service processor 110 and the software as a service application program 210. In this way, the business data exchange system 100 can implement a service call mechanism between the software as a service application program 210 set in the cloud and the application system 220 set at the ground end.

Figure 2:
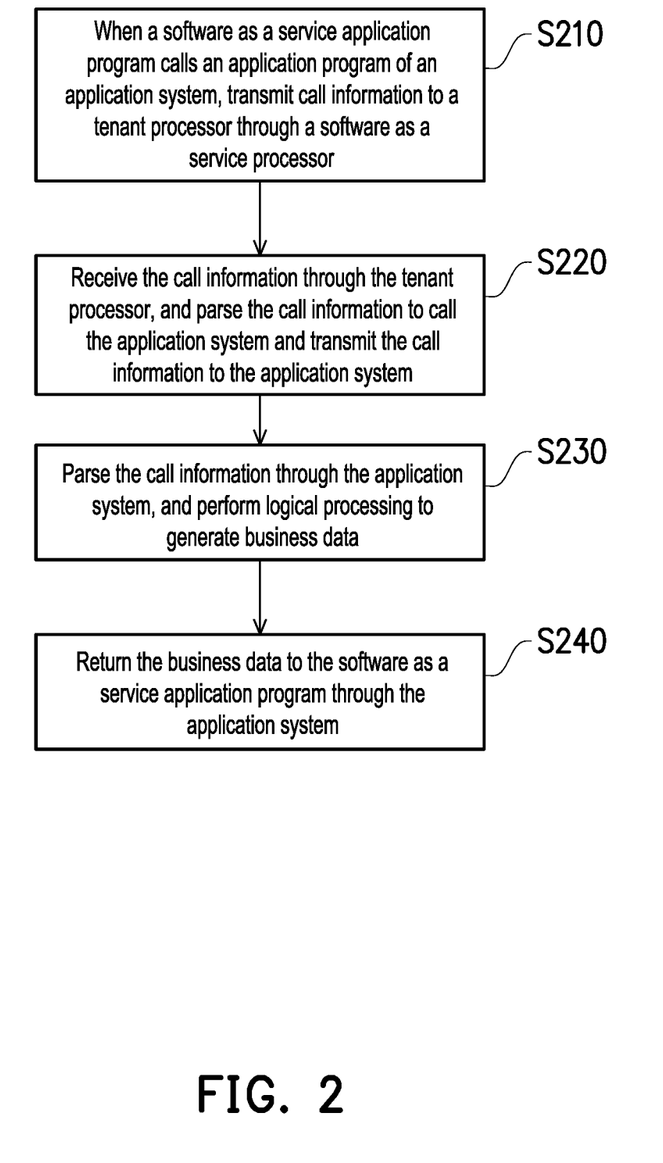
FIG. 2 is a flowchart of a business data exchange method according to an embodiment of the disclosure.

FIG. 2 is a flowchart of a business data exchange method according to an embodiment of the disclosure. Referring to FIG. 1 and FIG. 2, the business data exchange system 100 may execute the following Steps S210 to S240 to implement data exchange. In the embodiment, the user may, for example, operate a function of the software as a service application program 210 set in the cloud to call the application system 220 set at the ground end. In Step S210, when the software as a service application program 210 calls an application program of the application system 220, the software as a service application program 210 may transmit call information to the tenant processor 120 through the software as a service processor 110. The software as a service processor 110 may transmit the call information to the tenant processor 120 from the pre-established transmission channel with the tenant processor 120 according to a calling requirement of the software as a service application program 210. In Step S220, the tenant processor 120 may receive the call information, and parse the call information to call the application system 220 and transmit the call information to the application system 220. In the embodiment, the call information may include, for example, an application system name, an application program, a service, and/or data, etc. to be called. The tenant processor 120 may transmit the call information to the application system 220 according to the call information. In Step S230, the application system 220 may parse the call information and perform logical processing to generate business data. In the embodiment, the application system 220 may generate the corresponding business data according to the service and/or the data to be called. In Step S240, the application system 220 may return the business data to the software as a service application program 210. In the embodiment, the application system 220 may return the business data to the tenant processor 120, and then return the business data to the software as a service processor 110 via the tenant processor 120. Finally, the software as a service processor 110 may return the business data to the software as a service application program 210. In this way, the software as a service application program 210 may efficiently and instantly call a specific application or a specific service function of the application system 220.

Figure 3:
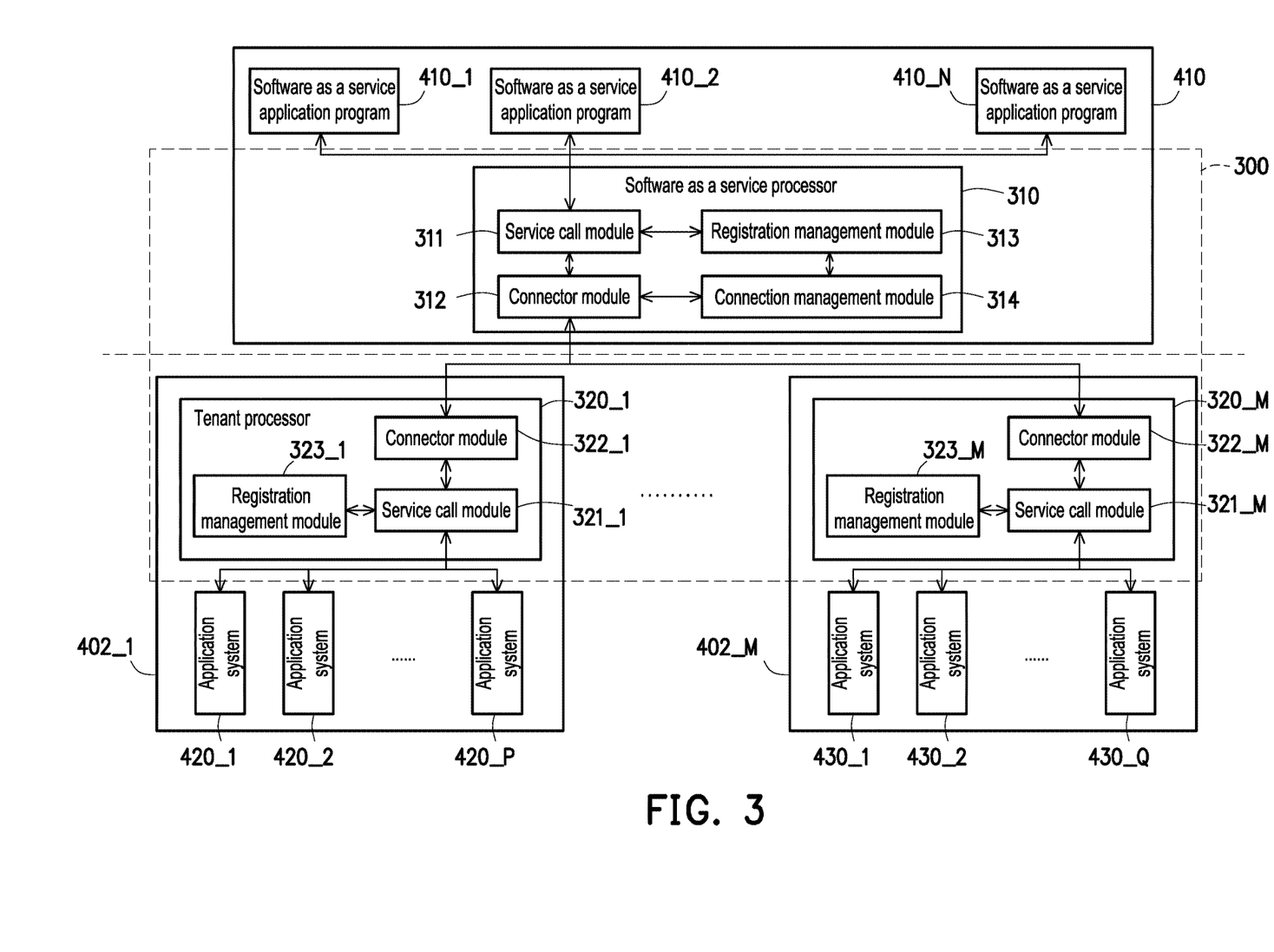
FIG. 3 is a schematic diagram of a business data exchange system according to another embodiment of the disclosure.

FIG. 3 is a schematic diagram of a business data exchange system according to another embodiment of the disclosure. Referring to FIG. 3, a business data exchange system 300 includes a software as a service processor 310 set in a cloud server 401 and multiple tenant processors 320_1 to 320_M set in multiple tenant servers 402_1 to 402_M, where M is a positive integer. In the embodiment, the cloud server 401 may implement, for example, a multi-tenant public cloud system, and the tenant servers 402_1 to 402_M may implement, for example, multiple ground end systems (for example, an internal business system of an enterprise) corresponding to multiple tenants. The software as a service processor 310 includes a service call module 311, a connector module 312, a registration management module 313, and a connection management module 314. The cloud server 401 also includes multiple software as a service application programs 410_1 to 410_N, where N is a positive integer. The tenant servers 402_1 to 402_M respectively include service call modules 321_1 to 321_M, connector modules 322_1 to 322_M, and registration management modules 323_1 to 323_M. The tenant servers 402_1 to 402_M may respectively include multiple application systems 420_1 to 420_P and 430_1 to 430_Q, where P and Q are respectively positive integers. It is worth noting that for the relevant hardware features and technical solutions of the business data exchange system 300 of the embodiment, reference may be made to the relevant descriptions of the business data exchange system 100 of the embodiment of FIG. 1 and FIG. 2, so there will be no repetition.

In the embodiment, the service call module 311 may be configured to route a service call issued by the multi-tenant public cloud system to the ground end system of the tenant. The connector module 312 may be configured to connect to the tenant servers 402_1 to 402_M through exclusive channels of different tenants. The registration management module 313 may be configured to receive a registration application of the ground end system of the tenant, and distribute the corresponding exclusive channel. The connection management module 314 may be configured to perform operations such as monitoring, traffic management, and exception monitoring for the exclusive channel of each tenant.

In the embodiment, the service call modules 321_1 to 321_M may be respectively configured to parse the received call information, so as to route to a specific application system. The connector modules 322_1 to 322_M may be respectively configured to register with the multi-tenant public cloud system, and may be connected to the software as a service processor 310 respectively through the exclusive channels. The registration management modules 323_1 to 323_M may be respectively configured to perform registration operations of the application systems 420_1 to 420_P and 430_1 to 430_Q, and may be configured to synchronize registration information to the software as a service processor 310.

Figure 4:
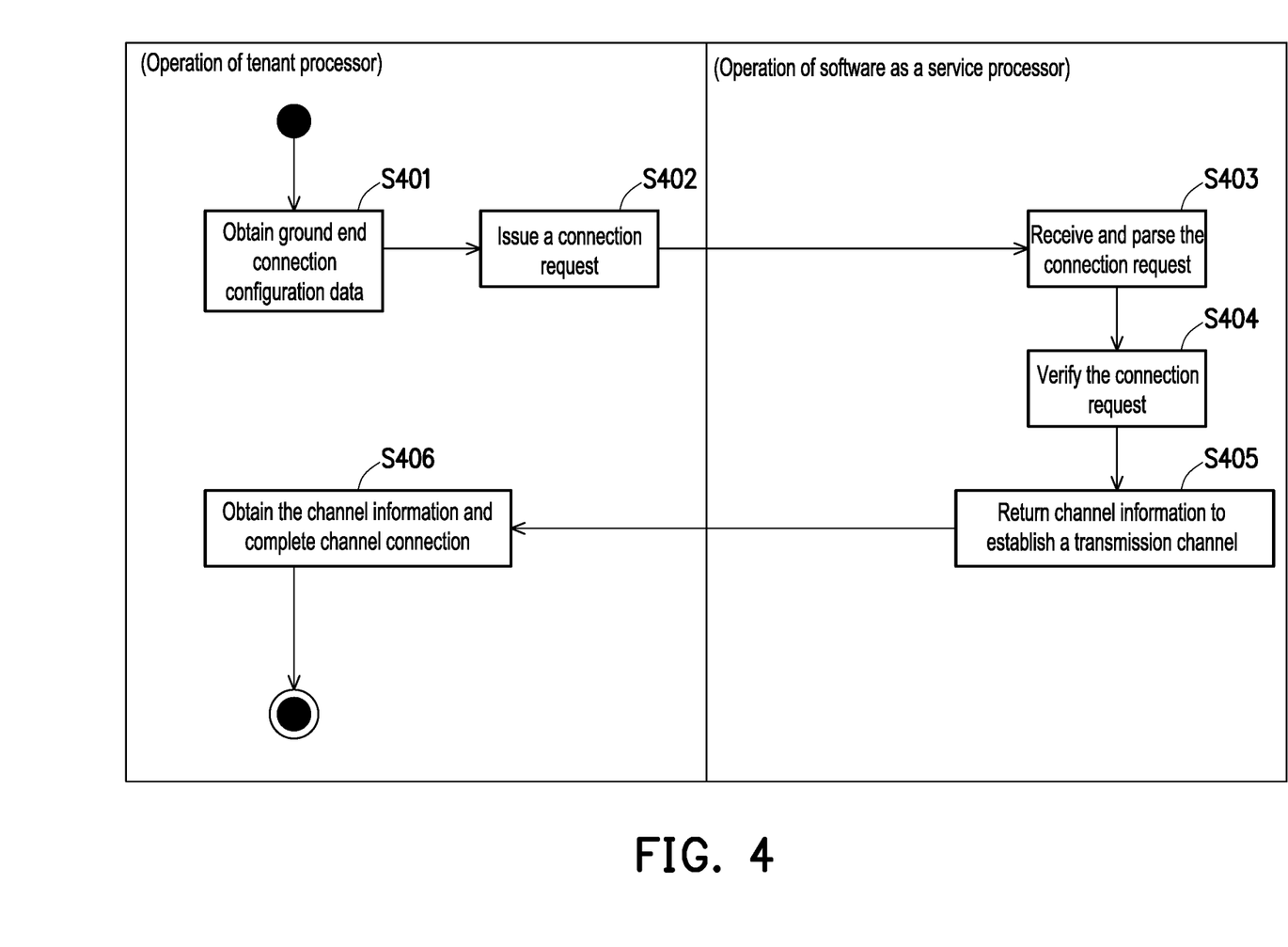
FIG. 4 is a flowchart of establishing channel connection according to an embodiment of the disclosure.

FIG. 4 is a flowchart of establishing channel connection according to an embodiment of the disclosure. Referring to FIG. 3 and FIG. 4, the establishment of connection between the software as a service processor 310 and the tenant processor 320_1 is taken as an example. In Step S401, the tenant server 402_1 may obtain ground end connection configuration data. The ground end connection configuration data may, for example, include tenant information. In Step S402, the connector module 322_1 of the tenant processor 320_1 may issue a connection request to the connector module 312 of the software as a service processor 310. The connector module 322_1 of the tenant processor 320_1 may issue the connection request to the connector module 312 of the software as a service processor 310 according to the ground end connection configuration data. In Step S403, the connector module 312 of the software as a service processor 310 may receive and parse the connection request. In Step S404, the connection management module 314 of the software as a service processor 310 may verify the connection request. In Step S405, the connection management module 314 of the software as a service processor 310 may return channel information through the connector module 312 to establish a transmission channel. The channel information may include tenant identification data (identification code) and channel identification data (identification code). The registration management module 313 may store the channel information. In Step S406, the connector module 322_1 of the tenant processor 320_1 may obtain the channel information and complete channel connection. The registration management module 323_1 may store the channel information. Therefore, an exclusive transmission channel may be established between the software as a service processor 310 and the tenant processor 320_1 to provide a secure and instant communication business data transmission function. In addition, the manner of establishing connection between the tenant processors 320_2 to 320_M and the software as a service processor 310 may be deduced by analogy.

Figure 5:
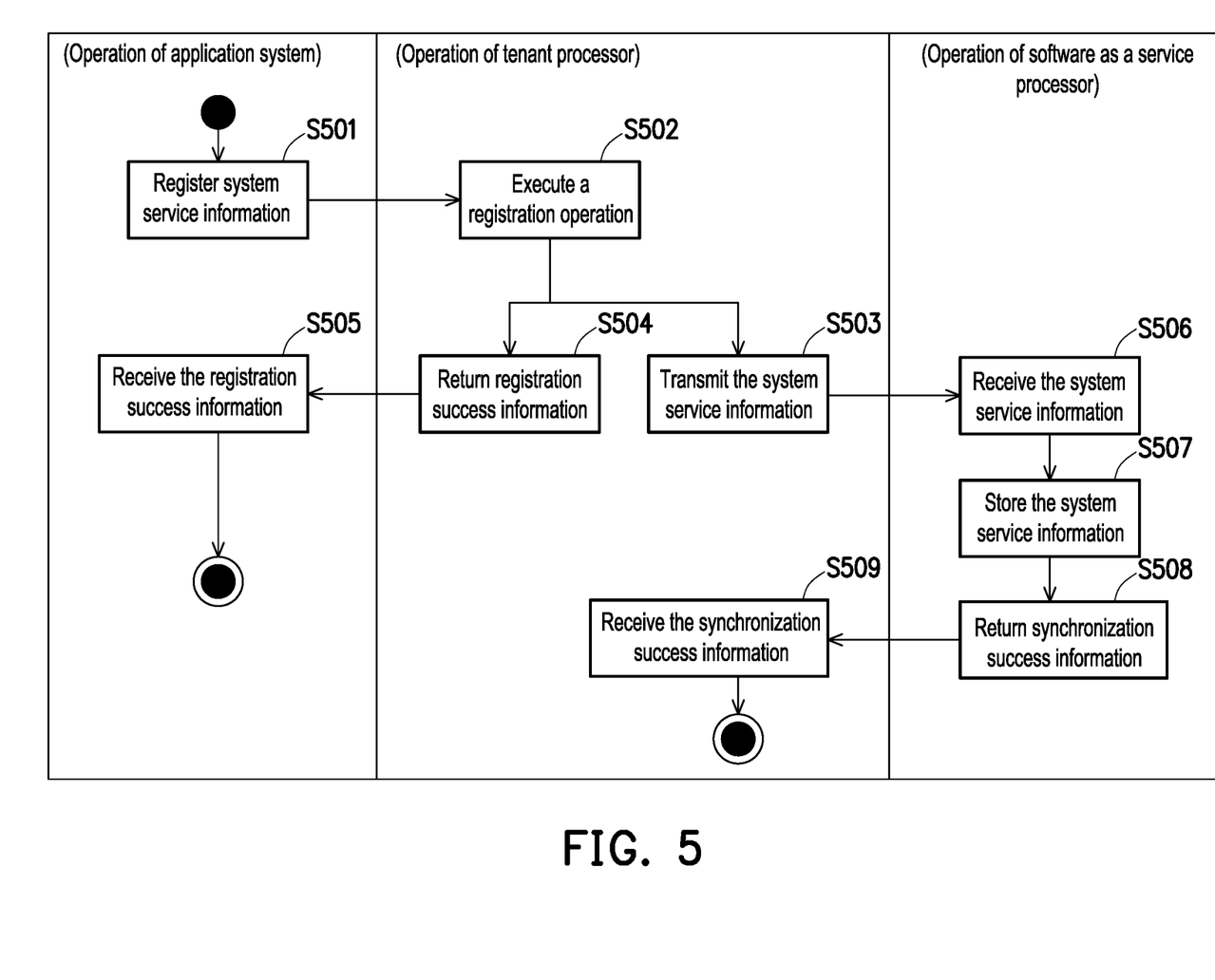
FIG. 5 is a flowchart of registering system service information according to an embodiment of the disclosure.

FIG. 5 is a flowchart of registering system service information according to an embodiment of the disclosure. Referring to FIG. 3 and FIG. 5, the application system 420_1 registering the system service information is taken as an example. In Step S501, the application system 420_1 registers the system service information. The application system 420_1 may obtain system service information to be registered, wherein the system service information may include, for example, tenant identification data (tenant name), an application system name, and service content. The service content may refer to one or more application programming interfaces (APIs), which may be, for example, a work order creation API, a working hour report API, etc., which is not limited in the disclosure. The application system 420_1 may transmit the system service information to be registered to the tenant processor 320_1. In Step S502, the registration management module 323_1 of the tenant processor 320_1 may register according to the system service information, and store the system service information and relevant registration information. In Step S503, the tenant processor 320_1 may transmit the system service information to the software as a service processor 310. In Step S504, the tenant processor 320_1 may return registration success information to the application system 420_1. In Step S505, the application system 420_1 may receive the registration success information. In Step S506, the connector module 312 of the software as a service processor 310 may receive the system service information. In Step S507, the tenant processor 320_1 may synchronize the system service information to the software as a service processor 310, so that the registration management module 313 of the software as a service processor 310 may store the system service information and correspondence information with tenants. In Step S508, the connector module 312 of the software as a service processor 310 may return synchronization success information to the tenant processor 320_1. In Step S509, the connector module 322_1 of the tenant processor 320_1 may receive the synchronization success information. Therefore, the application system 420_1 may conveniently and synchronously register the relevant registration information to the software as a service processor 310 and the tenant processor 320_1. Moreover, the service registration manner of each of the application systems 420_1 to 420_P and 430_1 to 430_Q may be deduced by analogy.

Figure 6:
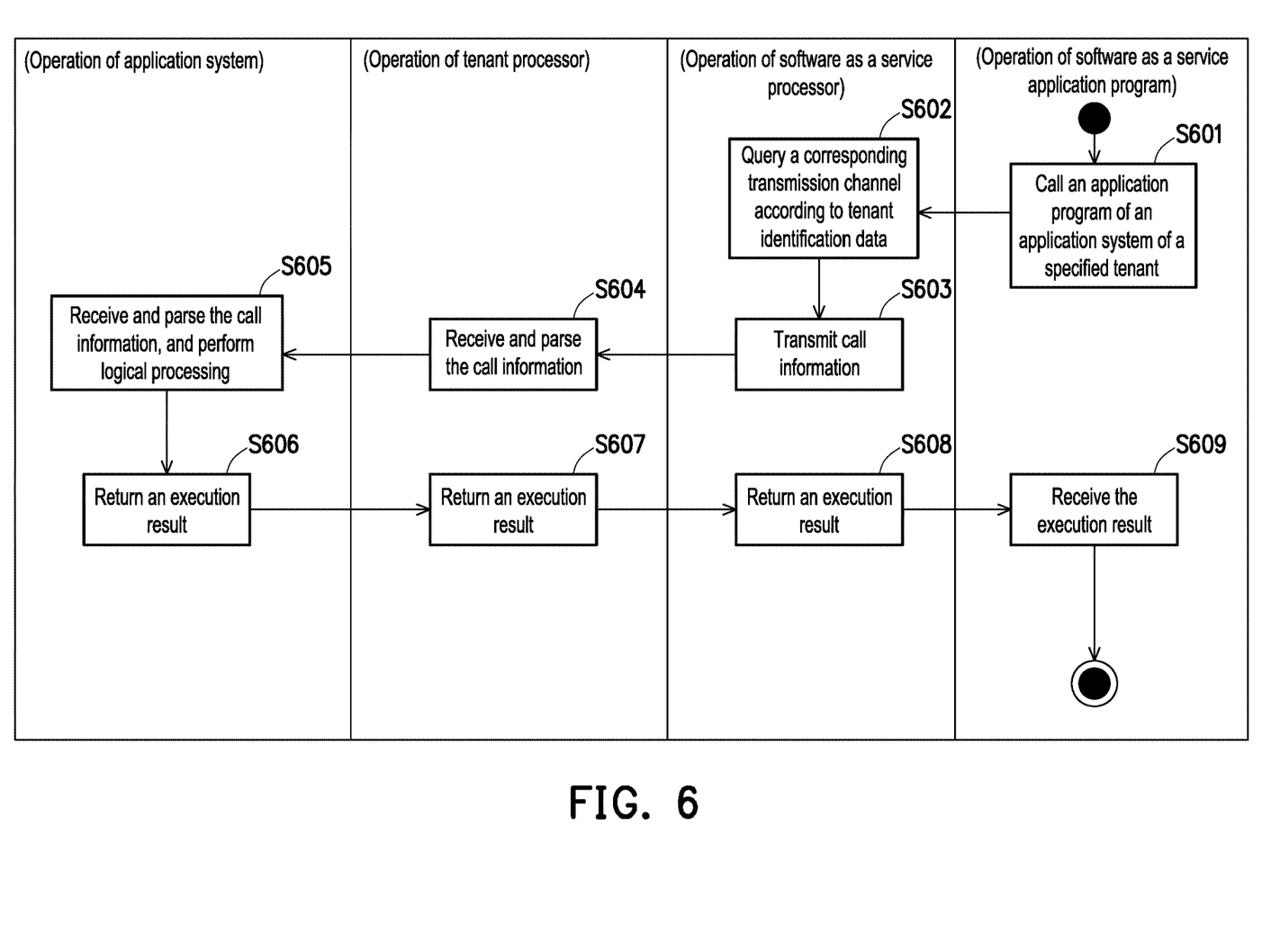
FIG. 6 is a flowchart of a business data exchange method according to another embodiment of the disclosure.

FIG. 6 is a flowchart of a business data exchange method according to another embodiment of the disclosure. Referring to FIG. 3 and FIG. 6, the software as a service application program 410_1 calling the service of the application system 420_1 is taken as an example. In Step S601, the software as a service application program 410_1 may receive an operation command of a tenant to call an application program (for example, a work order creation API) of the application system 420_1 of a specified tenant. For example, the enterprise may call a business system set in the enterprise through a cloud service. The software as a service application program 410_1 may transmit tenant identification data (tenant ID) and call information to the software as a service processor 310. For example, the call information may include an application system name to be called: an enterprise resource planning (ERP) system, an application program to be called: the work order creation API, data to be called: work order number, production product name, and/or production quantity, etc. In Step S602, the service call module 311 of the software as a service processor 310 may query channel information of a corresponding transmission channel stored in the registration management module 313 according to the tenant identification data. In Step S603, the connector module 312 and the connection management module 314 of the software as a service processor 310 may transmit the call information to the tenant processor 320_1 from the corresponding transmission channel according to the channel information.

In Step S604, the connector module 322_1 of the tenant processor 320_1 may receive and parse the call information. The service call module 321_1 of the tenant processor 320_1 may connect to the application system 420_1 according to the application system name and an application program name obtained by parsing the call information to transmit the call information to the application system 420_1. In Step S605, the application system 420_1 may receive and parse the call information, and perform corresponding logical processing (for example, executing the work order creation API) to generate corresponding business data (for example, the work order number, the production product name, and/or the production quantity, etc.). In Step S606, the application system 420_1 may return an execution result to the tenant processor 320_1. The application system 420_1 may transmit the business data to the tenant processor 320_1. In Step S607, the connector module 322_1 of the tenant processor 320_1 may return the execution result to the software as a service processor 310. The connector module 322_1 of the tenant processor 320_1 may receive the business data, and further transmit the business data to the software as a service processor 310. In Step S608, the software as a service processor 310 may return the execution result to the software as a service application program 410_1. The connector module 312 of the software as a service processor 310 may receive the business data, and further transmit the business data to the software as a service application program 410_1. In Step S609, the software as a service application program 410_1 may receive the execution result. The software as a service application program 410_1 may perform corresponding processing according to the business data returned by the application system 420_1 and feed back to the tenant. Therefore, a tenant may effectively and quickly call the application system 420_1 set at the ground end through the software as a service application program 410_1 set in the cloud. In addition, the calling manner between other software as a service application programs 410_1 to 410_N and application systems 420_1 to 420_P and 430_1 to 430_Q may be deduced by analogy.

In summary, in the business data exchange system and the business data exchange method of the disclosure, the software as a service processor may be set in the cloud, and the tenant processor may be set at the ground end to establish a secure and exclusive transmission channel through the software as a service processor and the tenant processor. The software as a service processor may instantly call a specific service in the application system according to the calling requirement of the software as a service application program, and the tenant processor may securely transmit data to the software as a service processor through the exclusive transmission channel to be further provided to the software as a service application program. Therefore, the business data exchange system and the business data exchange method of the disclosure can have an efficient and reliable data exchange function.

Finally, it should be noted that the above embodiments are only configured to illustrate, but not to limit, the technical solutions of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

What is claimed is:

1. A business data exchange system, comprising:
a software as a service processor, disposed in a cloud server, and coupled to a software as a service application program; and
a tenant processor, coupled to the software as a service processor and an application system, wherein the tenant processor and the application system are disposed in a tenant server, and the tenant server set up on-premises, wherein the application system comprise an application program,
wherein in response to the software as a service application program receives an operation command of an user to call the application program of the application system, the software as a service processor transmits call information to the tenant processor, through an exclusive transmission channel, the call information includes an application system name and an application program name,
wherein the tenant processor receives the call information and parses the call information to call the application system and transmit the call information to the application system according to the application system name,
wherein the application system parses the call information and performs logical processing of the application program to generate business data according to the application program name, and the application system returns the business data to the software as a service application program,
wherein the business data comprises at least one of a work order number, a production product name, and a production quantity.

2. The business data exchange system according to claim 1, wherein the tenant processor pre-issues a connection request to the software as a service processor according to an on-premises connection configuration data, and the software as a service processor receives and verifies the connection request, and the software as a service processor returns channel information to the tenant processor to establish the exclusive transmission channel between the software as a service processor and the tenant processor,
wherein in response to the software as a service application program receives an operation command of an user to call the application program of the application system, the software as a service processor further obtains tenant identification data from the software as a service application program, and queries the channel information of the exclusive transmission channel stored in a registration management module according to the tenant identification data, and the software as a service processor connects to the tenant processor through the exclusive transmission channel,
wherein the channel information comprises a pre-established tenant identification code and a pre-established channel identification code.

3. The business data exchange system according to claim 1, wherein when the application system registers system service information, in response to the application system transmits the system service information to the tenant processor, the tenant processor executes a registration operation,
in response to the tenant processor synchronizes the system service information to the software as a service processor, the software as a service processor stores the system service information.

4. The business data exchange system according to claim 1, further comprising:
another tenant processor, coupled to the software as a service processor and set in another tenant server.

5. The business data exchange system according to claim 1, wherein the software as a service processor is coupled to a plurality of software as a service application programs.

6. The business data exchange system according to claim 1, wherein the tenant processor is further coupled to another application system.

7. A business data exchange method, comprising:
in response to a software as a service application program receives an operation command of an user to call an application program of an application system, transmitting call information to a tenant processor through a software as a service processor through an exclusive transmission channel, wherein the call information includes an application system name and an application program name;
receiving the call information through the tenant processor, and parsing the call information to call the application system and transmit the call information to the application system according to the application system name;
parsing the call information through the application system, and performing logical processing of the application program to generate business data according to the application program name; and
returning the business data to the software as a service application program through the application system,
wherein the business data comprises at least one of a work order number, a production product name, and a production quantity,
wherein the software as a service processor is disposed in a cloud server, the tenant processor and the application system are disposed in a tenant server, and the tenant server set up on-premises.

8. The business data exchange method according to claim 7, wherein the step of transmitting the call information to the tenant processor through the software as a service processor comprises:

pre-issuing a connection request to the software as a service processor according to an on-premises connection configuration data through the tenant processor;

receiving and verifying the connection request through the software as a service processor;

returning channel information to the tenant processor to establish the exclusive transmission channel between the software as a service processor and the tenant processor through the software as a service processor;

in response to the software as a service application program receiving an operation command of an user to call the application program of the application system, further obtaining tenant identification data from the software as a service application program through the software as a service processor, and querying the channel information of the exclusive transmission channel stored in a registration management module according to the tenant identification data, wherein the registration management module is configured to perform registration operations of the application system; and connecting the software as a service processor to the tenant processor through the exclusive transmission channel, wherein the channel information comprises a pre-established tenant identification code and a pre-established channel identification code.

9. The business data exchange method according to claim 7, further comprising:

when the application system registers system service information, in response to the application system transmits the system service information to the tenant processor executing a registration operation through the tenant processor; and in response to the tenant processor synchronizes the system service information to the software as a service processor, storing the system service information through the software as a service processor.

* * * * *